United States Patent [19]
Rossi

[11] Patent Number: 5,266,767
[45] Date of Patent: Nov. 30, 1993

[54] FUSING MACHINE RECIPROCATING TURRET WITH AUTOMATIC ELECTRODE REPLACEMENT

[75] Inventor: Alessandro Rossi, Florence, Italy
[73] Assignee: Axis USA, Inc., Marlborough, Mass.
[21] Appl. No.: 765,574
[22] Filed: Sep. 25, 1991
[51] Int. Cl.$^5$ ............................................. B23K 11/30
[52] U.S. Cl. .............................. 219/86.25; 219/56.1; 219/86.8
[58] Field of Search .................. 269/56.1, 86.25, 86.8, 269/86.33, 86.41, 86.7; 29/369; 483/28, 35, 67

[56] References Cited

U.S. PATENT DOCUMENTS

| | | | |
|---|---|---|---|
| 3,663,789 | 5/1972 | Camardella | 219/56.1 |
| 4,510,370 | 4/1985 | Szantho et al. | 219/86.25 |
| 4,766,282 | 8/1988 | Riordan et al. | 219/86.25 |
| 4,904,838 | 2/1990 | Szantho et al. | 219/86.8 |

FOREIGN PATENT DOCUMENTS 201112 11/1986 European Pat. Off. .......... 219/86.8

*Primary Examiner*—Goeffrey S. Evans
*Attorney, Agent, or Firm*—Karen G. Horowitz; Robert R. Jackson

[57] ABSTRACT

Apparatus for fusing electric motor parts (e.g., fusing electric motor armature coil leads to the commutator of the armature) includes positive control of the elements which move to perform the fusing cycle so that the fusing cycle stroke can begin at any desired location. This facilitates shortening the stroke and making it constant despite changes or deviations in the workpieces being fused. It also facilitates withdrawal of the fusing head to a location which is more remote from the workpiece when the fusing electrode is to be changed due to wear. In fusing machines having a rotating turret which carries several fusing electrodes, the mass of the moving parts is reduced by mounting the actuator which reciprocates the turret on the frame of the machine, and by deriving the motion required to rotate the turret from the reciprocation rather than from a separate actuator.

21 Claims, 10 Drawing Sheets

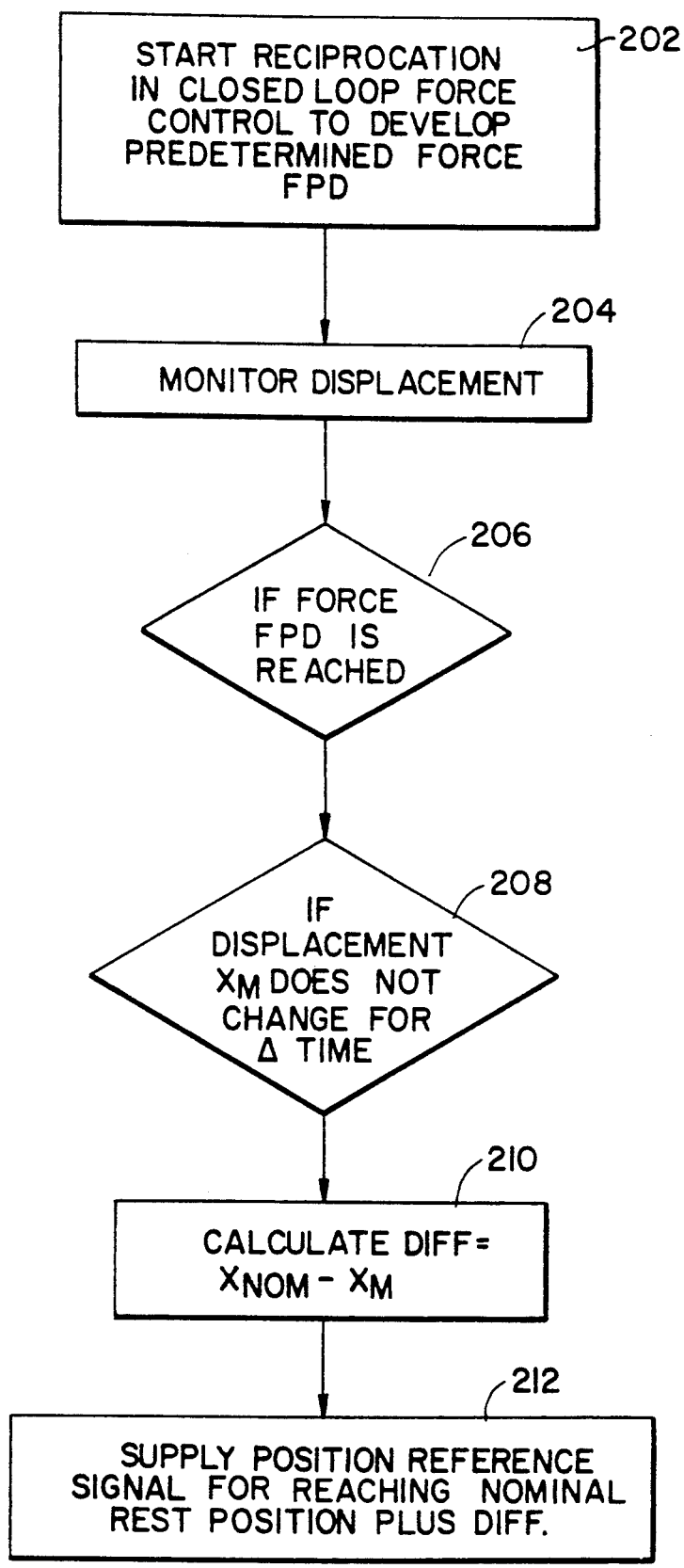

FUSING MACHINE RECIPROCATING TURRET WITH AUTOMATIC ELECTRODE REPLACEMENT

BACKGROUND OF THE INVENTION

This invention relates to apparatus for fusing together electric conductors, and more particularly to apparatus for fusing coil leads to tangs or slots of electric motor armature commutators.

Electric motor parts such as armatures have coils of wire and heavier metal parts (e.g., commutators) to which leads from the coils must be electrically and mechanically connected. A technique which is frequently used for making these mechanical and electrical connections is known as fusing. This technique involves the application of heat and pressure from a fusing electrode to the two elements to be joined (e.g., the commutator and the coil lead) in such a way that these two elements are pressed into firm and intimate contact with one another, and at least one element (e.g., the commutator) is permanently deformed to hold the two elements together. For example, a coil lead wrapped around a commutator tang may be fused to the commutator by deforming the tang down into intimate contact with the lead. Alternatively, a coil lead in a commutator slot may be fused to the commutator by partly crushing the slot in order to close it around the lead. The heat required for the fusing process is typically generated by passing an electric current through the fusing electrode and the elements to be fused and into a ground electrode which contacts another part of the workpiece. The fusing electrode (typically made of tungsten) is the highest resistance element in this circuit and is therefore the element which is heated by this current. Heat flows from the electrode into the elements being fused.

The tip of the fusing electrode which contacts the elements being fused is subject to considerable mechanical, thermal, and even electrical stress. Accordingly, these tips wear quite rapidly and must be changed fairly frequently. European patent application 201,112 shows fusing apparatus in which several fusing electrodes are mounted on a turret which both reciprocates (to perform fusing operations) and rotates (to bring a new fusing electrode into operative position when the preceding electrode is worn). When all the electrodes on a turret are worn, the turret can be removed and either replaced with a new turret or the old turret put back on with the electrodes either replaced or resharpened.

The machine shown in the above-mentioned European application has fairly simple control of the fusing cycle. More recent developments in this technology provide more sophisticated fusing cycle control such as closed loop control based on the displacement of the fusing electrode and/or the force applied by the electrode. Such more sophisticated control is shown, for example, in commonly assigned, U.S. Pat. No. 5,063,279, and hereby incorporated by reference herein. While it would be desirable to apply these more sophisticated control techniques to fusing machines having rotating turrets for electrode replacement, there are several respects in which the known rotating turret machines are not especially well suited to such control. For example, the heavier the moving elements are, the more difficult it is to achieve accurate and precise closed loop force and/or displacement control. The more massive the controlled elements, the more serious a problem vibration and inertia become. The known rotating turret fusing machines have relatively heavy moving parts and are therefore not ideally suited to more sophisticated control.

As another example of the respects in which known rotating turret fusing machines do not lend themselves particularly well to more sophisticated control, the known machines typically have only a single rest position of the moving elements. This is the position from which each fusing cycle starts, as well as the position in which the turret is rotated or removed. Accordingly, this rest position must be fairly far from the armature or other workpiece being fused so that the turret can be rotated or removed without risk of damage to the armature. If the machine is intended for fusing armatures of different diameters, the largest armature diameter determines the acceptable rest position. Accordingly, the rest position may have to be quite far from the fusing position for many or even all of the armatures to be fused. This lengthens the fusing cycle stroke, wastes time, and reduces the production rate of the machine. These disadvantages may be especially significant when employing closed loop force and/or displacement control because with such control the fusing head may have to move more slowly in order to allow time for analysis and use of the feedback signal. Accordingly, the shortest possible fusing cycle stroke is generally preferable with closed loop control. Closed loop control may also benefit from having fusing cycle strokes of uniform length regardless of the size of the workpieces being fused. This may reduce or substantially eliminate the cycle control reprogramming that would otherwise be required when adapting the machine to fuse workpieces of different sizes.

In view of the foregoing, it is an object of this invention to provide improved machines for fusing electric motor parts.

It is a more particular object of this invention to provide fusing machines, especially (but not necessarily) of the type having a rotating turret holding several fusing electrodes, which are better adapted to more sophisticated control such as closed loop force and/or displacement control.

It is another more particular object of this invention to provide fusing machines having a fusing stroke of constant length regardless of such factors as deviations or changes in the dimensions of the parts being fused.

It is yet another more particular object of this invention to provide fusing machines with less massive moving parts and which lend themselves to the use of shorter fusing cycle strokes.

SUMMARY OF THE INVENTION

These and other objects of the invention are accomplished in accordance with the principles of this invention by providing a fusing machine in which the movement of the fusing head is positively controlled at all times so that the fusing cycle stroke can start from any desired position relative to the workpiece, and so that the fusing head can be moved farther from the workpiece when it is necessary to change the electrode. This allows the fusing cycle starting position to be relatively close to the workpiece and to be adjusted for changes or deviations in the workpiece. The length of the fusing cycle stroke can thereby be made constant for all workpieces if desired. The machine may measure a dimension of a workpiece to be fused in order to determine the fusing stroke starting point from that measurement. In the case of fusing machines with rotating turrets, the weight of the moving parts of the machine is reduced in accordance with the invention by mounting the actuator which reciprocates those parts on the frame of the machine, and by deriving the motion required to rotate the turret from the reciprocating motion rather than from a separate actuator.

Further features of the invention, its nature and various advantages, will be more apparent from the accompanying drawings and the following detailed description of the preferred embodiments.

BRIEF DESCRIPTION OF THE DRAWINGS

FIG. 1 is taken generally along the line 1-1 in FIG. 2, although additional elements are shown in FIG. 1. In The vicinity of the uppermost electrode 11, the alignment of section 1-1 is shifted slightly to one side in FIG. 2 so that representative bolts 15 will be shown in FIG. 1.

FIG. 11 is a flow chart of illustrative operations which can be carried out in the apparatus of this invention.

DETAILED DESCRIPTION OF THE PREFERRED EMBODIMENTS

Figure 1:
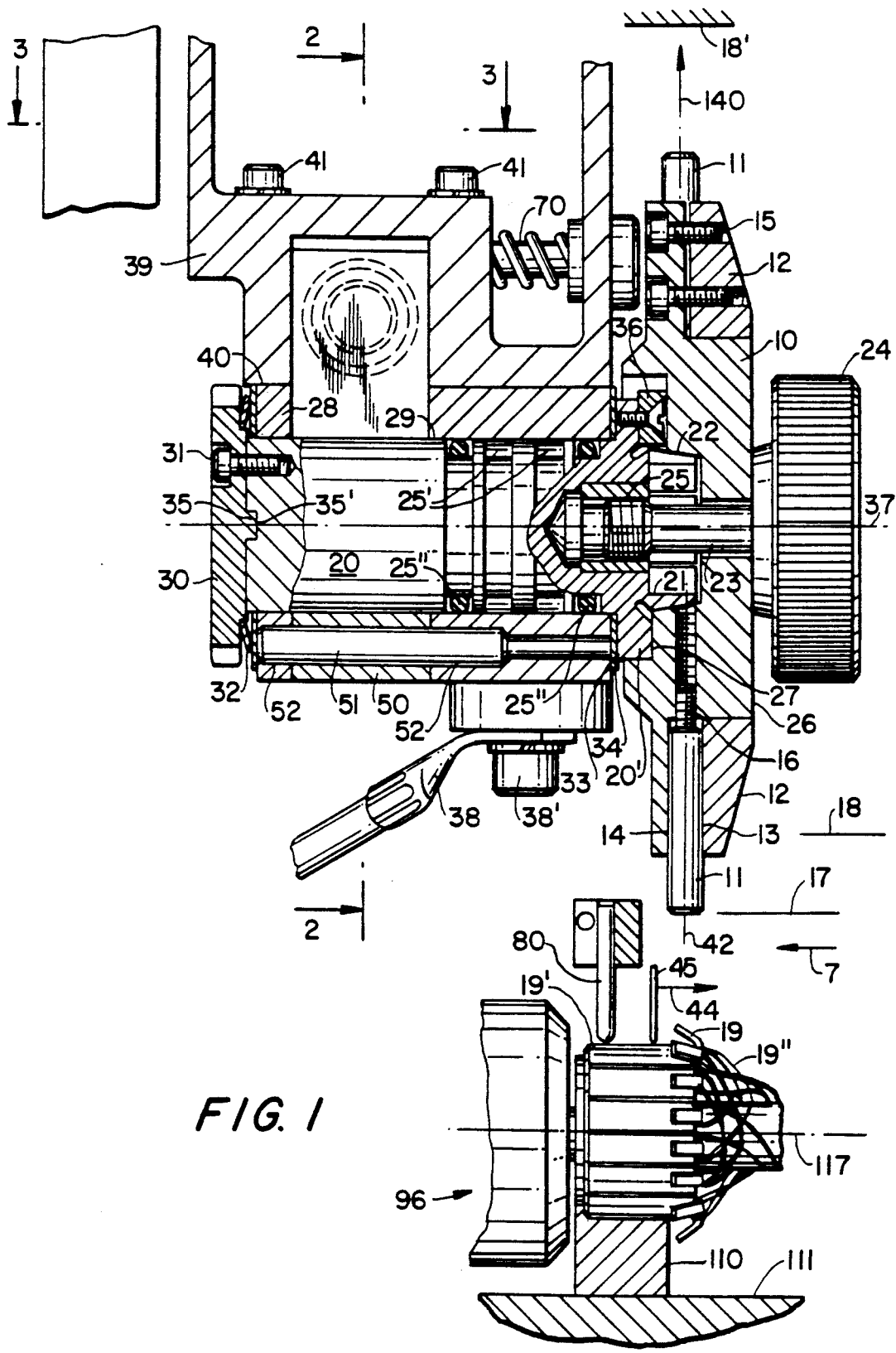
FIG. 1 is a partial elevational sectional view of an illustrative embodiment of a fusing machine constructed in accordance with the principles of this invention.

Although the invention is described herein in the context of fusing machines with multiple fusing electrodes on a rotating turret, it will be understood that many of the features of the invention are equally applicable to other types of fusing machines such as those with only a single fusing electrode and no rotation of a turret to automatically replace the electrode.

In the machine shown in the drawings, a certain number of electrodes 11 are carried by a turret 10. Each electrode 11 is fixed to turret 10 by means of a removable clamping block 12 which has a part-cylindrical seat 13 for receiving a portion of the electrode's external surface. A mating part-cylindrical seat 14 of turret 10 confronts the seat of the clamping block in order to receive another portion of the electrode's external surface. By tightening bolts 15 the electrode can be firmly fixed between the clamping block and the turret. An adjustment screw 16, threadedly engaged in a bore aligned and communicating with the space between part-cylindrical seats 13 and 14, can engage the end of electrode 11 and acts as a reference surface in order to position the electrode in relation to the center of the turret defined by axis 37.

In order to obtain satisfactory fusing (i.e., fusing in required time with no overheating of the parts to be fused), attachment of the electrode to the turret must present low electrical resistance to passage of the current required to fuse. This can be accomplished by having an electrode of prismatic form which is received against precisely machined electrode seats of turret 10 so that a considerable surface of such an electrode can be in contact with turret 10 in order to reduce the electrical resistance for the passage of current. If using an electrode which has a cylindrical form for contacting turret 10, then precisely machined seats for receiving the electrodes and an elastically deformable clamp connection as shown in FIG. 1 are appropriate for guaranteeing that sufficient electrode surface is in firm contact with the turret.

The tip portion of the electrode having the surface which comes into contact with parts to be fused (e.g., the top surface of depicted commutator tang 19 around which one or more coil leads 19" are looped, or alternatively a commutator ridge having a slot containing coil leads) is usually made of tungsten material. This portion of the electrode has a well known prismatic configuration which presents a contact surface having dimensions and inclination based on the parts to be fused.

Electrode 11, required to carry out the fusing operation, translates along axis 42 from rest position 17 in order to contact parts 19 to be fused (in the embodiment of FIG. i, the tangs of an armature commutator). After a fusing operation, electrode 11 translates back to starting position 17. The armature is then rotated about axis 117 to position another tang 19 for fusing, and the fusing cycle is repeated. Rest position 17 is preferably relatively close to the workpiece to keep the fusing cycles as short as possible. In order to fuse correctly, low electrical resistance should be guaranteed all along the path provided for passage of the electric current. In particular, all the connections between dismountable parts should present low electrical resistance. In the embodiment of FIG. 1, one factor in achieving low electrical resistance is the contact of the large external surface of shaft 20 with its support, and also a firm contact between turret 10 and shaft 20 at face 27. Fusing cycles are preferably accomplished using closed loop control of the electrode displacement and/or using closed loop control of the electrode force, either of which is obtained by means of programmable controls. Further information regarding the way the fusing cycle is preferably accomplished is found in the above-mentioned patent application Ser. No. 436,633.

Turret 10 is releasably connected to shaft 20 by engaging hollow protrusions 21 of the shaft with the seat 22 of the turret. Screw 23 having handle 24 passes through turret 10 and also through hollow protrusions 21 to engage threaded bore 25 of shaft 20. Once turret 10 has been mounted by engaging hollow protrusions 21 of the shaft with seat 22 of the turret, handle 24 can be turned to cause screw 23 to thread into bore 25, thereby causing the handle face to abut and press against front face 26 of the turret. Further turning of handle 24 causes seat 22 of the turret to move along hollow protrusions 21 until a back face 27 of the turret comes into abutment with an opposite shoulder 20' of shaft 20. A final forced turning of handle 24 generates a sufficient friction reaction between back face 27 of the turret and opposite shoulder 20' of shaft 20 to impede rotation and translation of turret 10 in relation to shaft 20. Such an operation to mount turret 10 is carried out with the electrode contact surface positioned at level 18 in relation to the workpiece to be fused. Position 18 is preferably more remote from the workpiece than fusing cycle start position 17.

To achieve the desired control performance with the required precision, the assembly which carries the turret should be rigidly connected to the members which impart translation to it and which also generate the force required by the electrode to fuse. The assembly which carries turret 10 should not carry unnecessary loads. More precisely, the assembly which carries turret 10 should be light in order to obtain high translation speeds so that the cycle time will be reduced to a minimum, especially when the abovedescribed closed loop force or displacement controls are used. To obtain these characteristics, actuators such as those provided for obtaining translation, rotation, and locking of the turret have not been mounted on the moving part of the apparatus. Instead, these elements are mounted on the stationary frame of the machine to the greatest extent possible.

Hollow protrusions 21 of shaft 20 are preferably split so that they deform elastically during the described operation to connect turret 10 to shaft 20. Shaft 20 is slideably mounted in bore 29 of support block 28. Gear wheel 30 is connected to an end face of shaft 20 by means of bolts 31. Disk spring or belleville washer 32 is interposed between the inside face of gear 30 and the rear end of support block 28. By tightening bolts 31, spring 32 can be preloaded in order to guarantee that rear face 33 of shaft shoulder 20' is pulled toward the front face of support block 28. Steel annular ring 34 is interposed between shoulder 20' and support block 28, and acts as a running surface when shaft 20 rotates in relation to support block 28. Without the use of such a ring 34, these members would run directly on each other, and might wear out too quickly. Gear 30 has key protuberance 35 which is received in a seat 35' machined in a rear face of shaft 20. A precisely machined block or tablet 36 is fixed to shaft shoulder 20' by means of a bolt. The angular position of tablet 36 around axis 37 of the mounted turret 10 is such that after engagement in a mating way in turret 10, electrodes 11 will be precisely phased in relation to the teeth of gear 30.

Electric current is transmitted to electrodes 11 through supply cable 38 permanently connected to support block 28 by means of a bolt connection 38'.

The parts which hold the electrode and which transmit electric current to it should be maintained at temperatures which do not exceed predetermined limits so that parts to be fused do not become overheated. Precautions to maintain such temperatures within certain limits are required even after current passage has terminated and when the electrode is still in contact with the parts to be fused. At this stage, the heat which could accumulate in the parts holding the electrode should not contribute to further heating of those which must be fused.

To avoid this, the parts which transmit electric current to the electrode should dissipate the heat which they tend to accumulate at extremely rapid rates. This can be accomplished by making such parts of copper material which dissipates heat at high rates and also conducts electric current efficiently. Accordingly, shaft 20 and support block 28 are preferably made of copper alloy material. Furthermore, heat dissipation can be increased by providing the parts which hold the electrode with their external surfaces having extensive exposure to the surrounding environment which is at room temperature.

Cooling of these parts can also be accomplished by circulating coolant or refrigerant fluid in their internal structure. In the embodiment of FIG. 1, shaft 20 is provided with grooves 25' communicating with fluid supply fittings (not shown) in support block 28. Seals 25" seated in shaft 20 and engaged with supporting block 28 form a sealed compartment for allowing fluid circulation through grooves 25'. Fluid circulating through channels 25' can pass through bores in shaft 20 and then through mating orifices (not shown) in face 27 in order to circulate in passages of turret 10. Such fluid passages are emptied by means of automatic discharging means prior to dismounting the turret from the shaft. This fluid circulation cools shaft 20, support block 28, and turret 10 during fusing.

Support block 28 is carried by translating member 39 made of aluminum alloy material. Connection between these two members is achieved by means of flange connection 40 using bolts 41.

Figure 5:
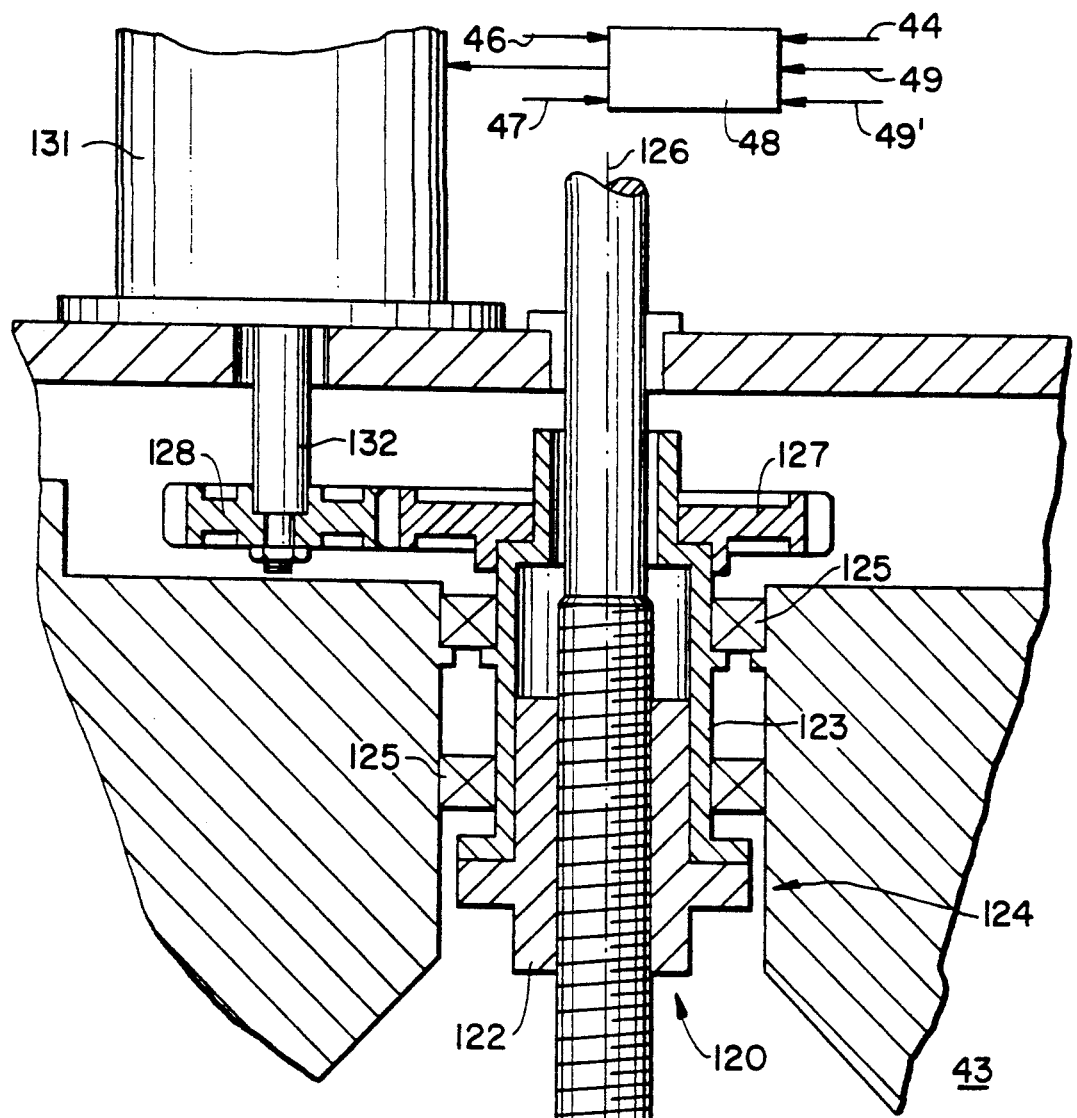
FIG. 5 is an upward continuation of FIG. 1.

In order to cause the operative electrode to move and fuse along axis 42, translating member 39 is guided and translated by advancement assembly 43 shown in FIG. 5. In such an assembly, translating member 39 is connected to the end of a conventional ball bearing screw or recirculating ballscrew 120 by means of flange connection 121. Ball recirculating sleeve or nut assembly 122 engages screw 120'. Sleeve 122 is carried by bell structure 123 and connected to this member by means of flange connection 124. Bell structure 123 is supported on bearings 125 so that it can rotate about axis 126. Gear 127 is flanged to the top end of bell structure 123. Gear 127 engages an aligned gear 128 connected to output shaft 132 of DC motor 131. By rotation of DC motor 131, sleeve 122 can be caused to rotate in order to translate screw 120' along axis 126. This causes the electrode 11 aligned with fusing axis 42 to translate along that axis. DC motor 131 is provided with a speed sensor and an encoder connected via leads 46 and 47 to appropriate controls 48 so that it can be controlled in closed feedback to guarantee programmed torque and speed output. In this way the electrode which fuses along axis 42 can be caused to operate with programmed speed values and programmed force values. The position of the electrode is positively controlled at all times. A conventional type of load sensor (not shown) can be mounted between the translating member 39 and support block 28 (FIG. 1) and connected to controls 48 (FIG. 5) via lead 49 to monitor the force experienced by electrode 11 during the fusing cycles in order to obtain further closed loop performance as described above. As another example, displacement of the electrode 11 currently being used for fusing can be monitored by connecting a conventional type of linear displacement potentiometer (not shown) between support block 28 and the fixed frame of the machine, and by applying the output of this potentiometer to controls 48 via lead 49'. This linear potentiometer may be used in place of an encoder associated with motor 131 as described above, or in addition to such an encoder so that controls 48 can detect play which may eventually develop in the mechanism which reciprocates fusing electrodes 11. Slide 129 (FIG. 5), connected to translating member 39, engages a guide 130 of the machine frame. Such a connection is required to avoid rotation of translating member 39 about axis 126 due to the tendency of screw 120' to turn.

Figure 2:
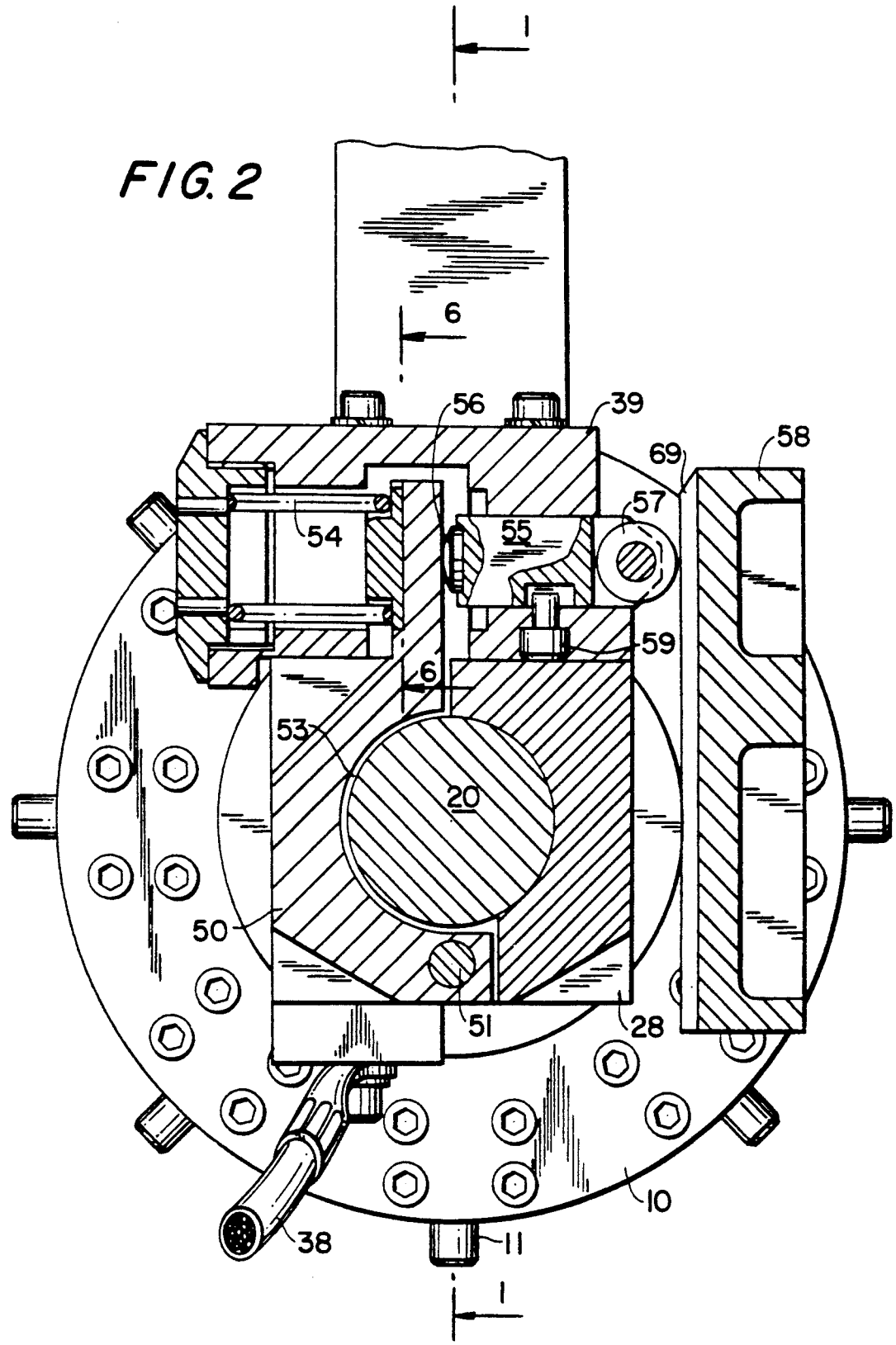
FIG. 2 is a partial elevational sectional view taken along the line 2-2 in FIG. 1.

To prevent turret 10 from rotating in relation to support block 28 during fusing operations, an arm 50 is hinged to support block 28 by means of a swivel pin 51 which has its ends supported in bores 52 of support block 28. The internal part-cylindrical surface 53 of arm 50 is biased against a portion of the outside surface of shaft 20. In order to avoid rotation of the shaft, precompressed spring 54 (FIG. 2) mounted in a seat of translating member 39 pushes on an end of arm 50 to generate a locking friction reaction between part-cylindrical surface 53 of arm 50 and the external surface of the shaft. Cursor 55 is slideably mounted in a bore aligned with the seat of spring 54. An anti-wear ball contact member 56 is seated in a front end of cursor 55 in order to engage arm 50. An idle wheel 57 is fixed to the other end of cursor 55 in order to engage a lever 58 hinged to the machine frame. Cursor 55 can slide to engage arm 50, but it cannot rotate because antirotation pin 59, fixed to the translating member 39, is engaged in a way formed in cursor 55. Lever 58 is hinged to the machine frame by means of pin 62 (FIG. 3), so that it can rotate in a plane positioned at a certain level above and parallel to the workpiece supporting table. One end of lever 58 is connected to the rod of pneumatic cylinder 60. The other end of lever 58 carries a rack mechanism 61 for engaging gear 30 fixed to shaft 20. Abutment surface 69 is also provided on this end of the lever to engage idle wheel 57 of cursor 55.

Figure 4:
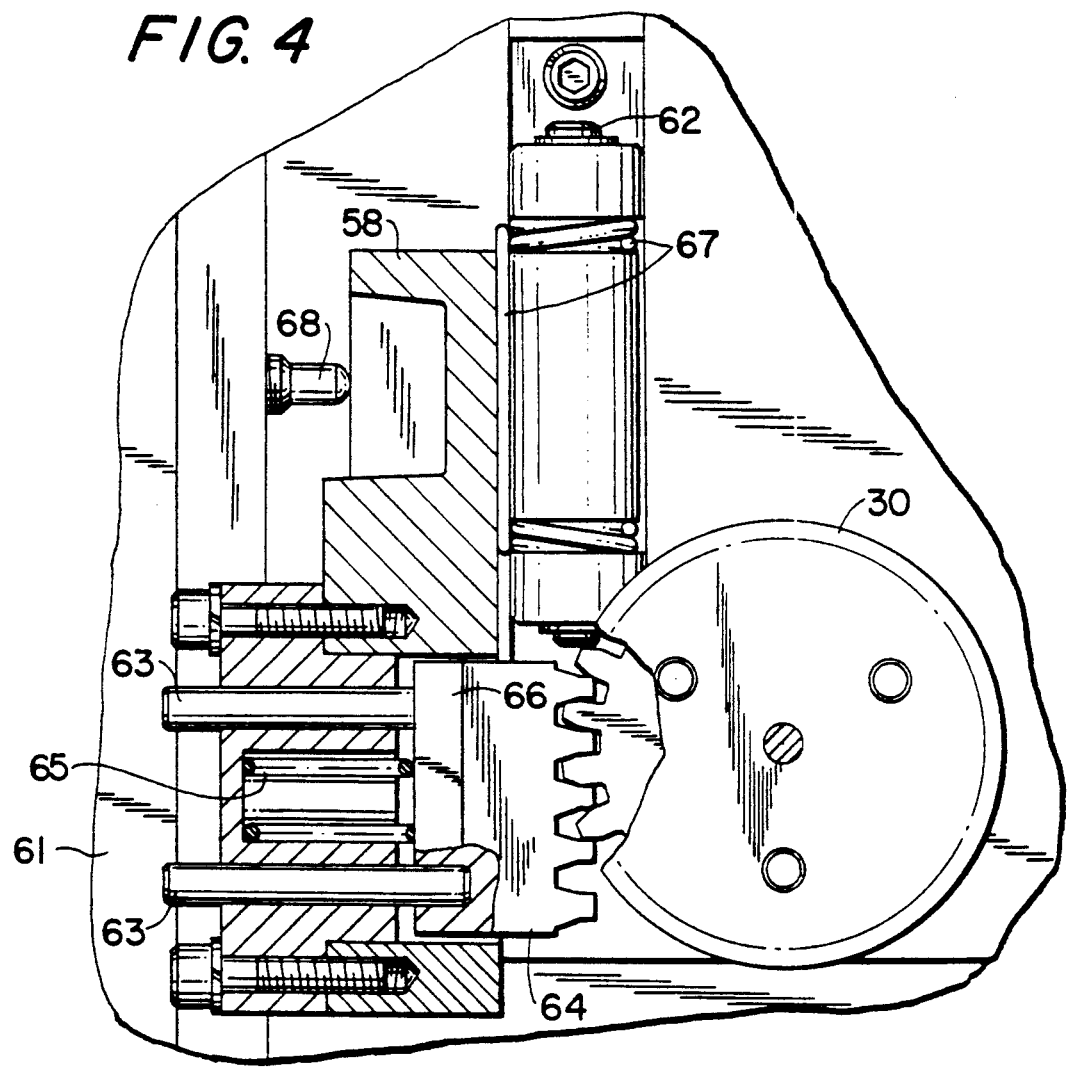
FIG. 4 is a partial elevational sectional view taken along the line 4-4 in FIG. 3.

Rack mechanism 61 consists of support pins 63 (FIG. 4) slideably mounted in bores of lever 58. Rack 64 is carried by support pins 63. Spring 65, seated between support pins 63, biases rack 64 toward gear 30. When gear 30 is not aligned with rack 64, ledge 66 of rack 64 abuts against a ridge (not shown) of lever 58 to limit the excursion of the rack's movement under the biasing action of spring 65. In this way, rack 64 is capable of accomplishing a lost motion when it is caused to engage the gear.

Figure 3:
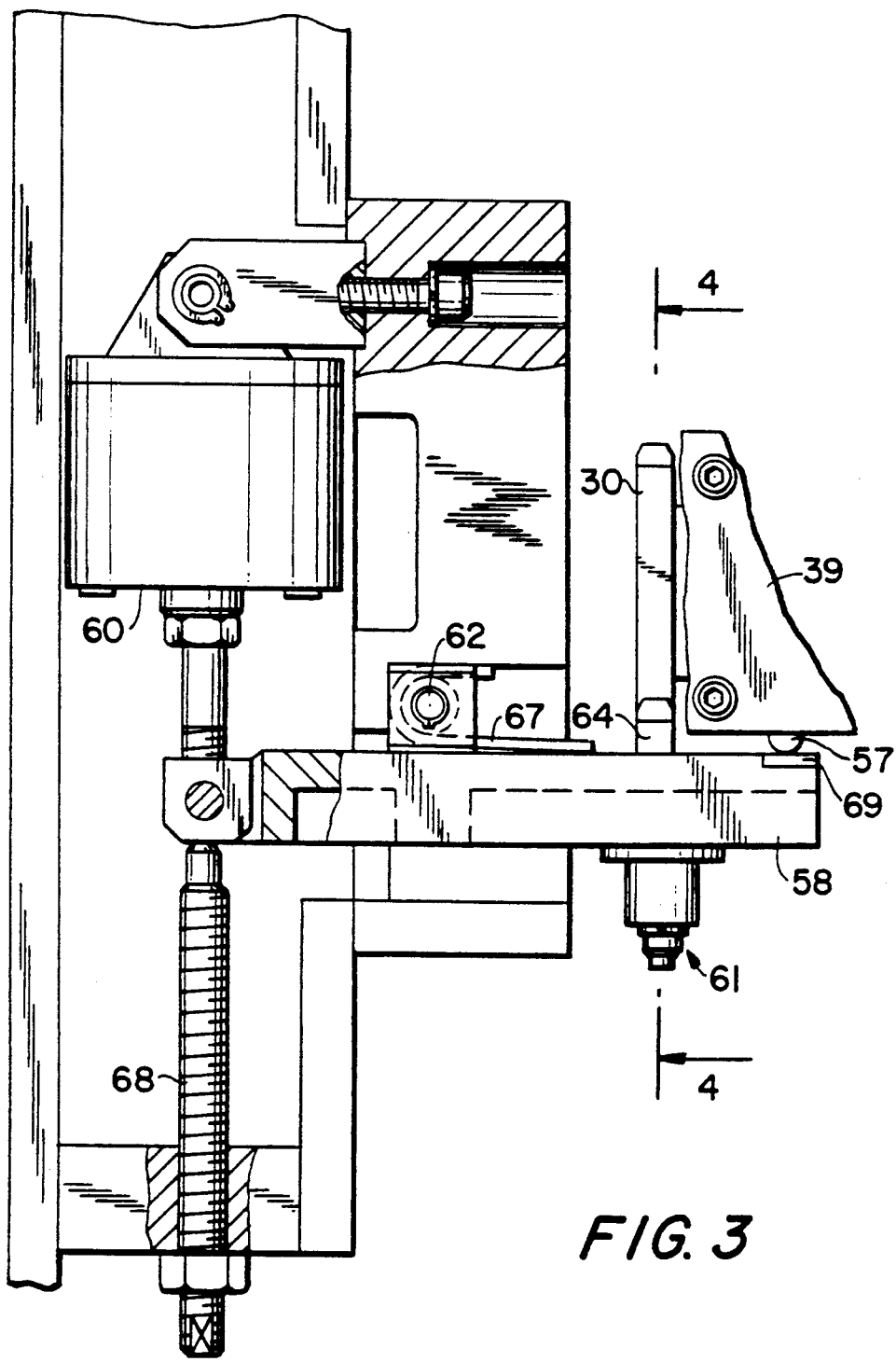
FIG. 3 is a partial plan view, partly in section, taken along the line 3-3 in FIG. 1.

By actuating pneumatic cylinder 60 (which is also mounted to the frame of the machine as shown in FIG. 3), lever 58 can be rotated about pin 62 to cause abutment surface 69 to engage and push cursor 55, and also to cause engagement of rack 64 with gear 30. The rod of pneumatic cylinder 60 moves until lever 58 comes into contact with adjustable stop 68. At the end of such a movement, cursor 55 will have translated to release the locking action which arm 50 has on shaft 20. Furthermore, at the end of such a movement, rack 64 will, as a result, be engaged with previously aligned gear 30.

Once this has occurred (signalled by a position sensor, not shown), the advancement assembly of FIG. 5 translates supporting block 28 along a path having a predetermined length in direction 140 (FIG. 1) so that gear 30 is turned by being engaged with stationary rack 64. In other words, the motion required to rotate turret 10 is derived from a linear motion of the turret support. The length of the motion in direction 140 is chosen to cause shaft 20 and therefore turret 10 to rotate by an angular increment which positions an adjacent and new electrode 11 into alignment with the workpiece to be fused on axis 42. During the above-mentioned translation, idle wheel 57 of cursor 55 runs on abutment surface 69 to maintain shaft 20 unlocked. This motion in direction 140 is preferably carried out using closed loop position control (e.g., making use of the output of the motor encoder or linear displacement potentiometer and controls 48 described above in connection with FIG. 5).

Important functioning features of the machine, such as those listed in the following, can be obtained by means of a programmable position control 48 of the actuator required to translate the assembly carrying the turret, or more precisely, by having such an assembly which is capable of assuming variable and programmable position.

When a workpiece must be fused, the electrode contact surface is advanced by assembly 43 (FIG. 5) along axis 42 (FIG. 1) starting from a known rest position 17. During such an advancement, electrode 11 comes into contact with the workpiece and continues to advance, thereby deforming the parts to be fused. In the preferred embodiment, controlled deformation of each commutator tang 19 requires that the tang, together with the wire beneath the tang, are deformed to predetermined final conditions (predetermined diameter variation of the wire under the tang and predetermined reduction in thickness of the tang). If this does not occur (e.g., the wire and tang are deformed in excess of the required specifications), the resulting connection will be weak and therefore subject to breaking during functioning of the final motor. If the deformation is not sufficient, the connection will not have the correct electrical properties and/or may not be maintained during functioning of the final motor. Furthermore, the commutator bars having the tangs to be fused may be located with a certain eccentricity in relation to the longitudinal axis of the armature. Particularly for thin wires, controlled deformation of the tang must take place with respect to the actual level of the commutator bar. Otherwise the final deformation of the tang and the wire can be influenced by the eccentricity that has previously been mentioned. To obtain correct results in a situation of this type, the eccentricity of the commutator bar having the tang to be fused can be measured by means of a movable contact sensor 45 (FIG. 1) or alternatively a conventional type of optical sensor (not shown). Such a measurement can be carried out prior to advancing the electrode 11 which fuses the tang or during the actual fusing operation. The sensor measures the distance of the commutator bar from an absolute reference. This information is then supplied via lead 44 to the controls 48 of the machine so that operations involving controlled displacement of the electrode are carried out referring to the actual position of the commutator bar having the tang to be fused. For example, contact sensor 45 can be mounted on the frame of the machine and momentarily lowered into contact with the surface of the commutator to be fused in order to produce an output indicative of the location of that surface. This output can be used in any of several ways. For example, it can be used to measure the overall size (radius or diameter) of the commutator in order to enable the controls of the machine to establish fusing cycle rest position 17 at a predetermined distance from the workpiece. This can be done relatively infrequently (e.g., whenever a new armature size or type is to be processed) or more frequently (e.g., before every fusing cycle or before closely spaced fusing cycles in order to measure possible eccentricity or other deviations of the commutator surfaces). Fusing cycle starting position 17 may be relocated on the basis of this measurement (e.g., in order to keep all fusing cycle strokes of approximately the same length), or the fusing cycle may otherwise be modified in accordance with this measurement. Further description of the fusing cycle which includes heating of the parts to accomplish the required final fused condition will be found in above-mentioned U.S. Pat. No. 5,063,279.

Figure 10:
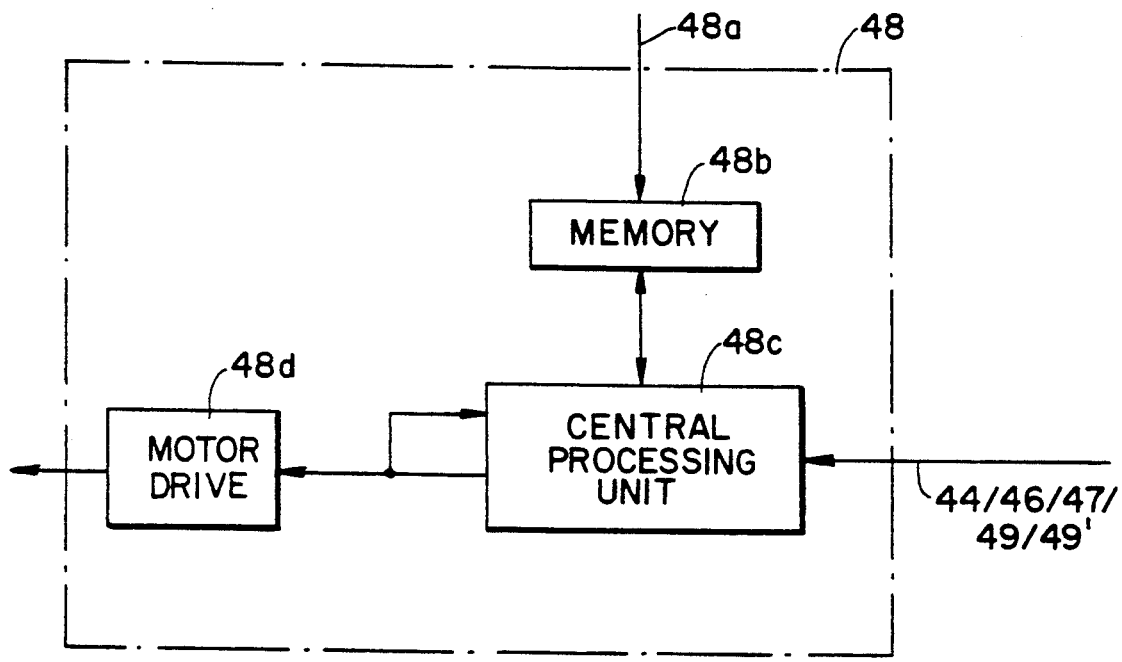
FIG. 10 is a more detailed block diagram of a portion of FIG. 5.

FIG. 10 shows programmable control 48 in more detail. The basic program is initially received via lead 48a and stored in memory 48b. Central processing unit ("CPU") 48c performs this program with additional inputs received as described above via leads 44, 46, 47, 49, and/or 49'. These inputs are both data for the program and may also be used by CPU 48c to modify the program. As a result of performance of the program, CPU 48c supplies a reference signal to motor drive 48d. This reference signal corresponds to the position which electrode 11 must reach in required timing along axis 42. Motor drive 48d operates motor 131 in accordance with this reference signal. CPU 48c may also compare this reference signal to the signal coming (via lead 47) from the encoder associated with motor 131. This encoder output signal is indicative of the actual position of electrode 11 along axis 42. For example, when the reference signal corresponding to rest position 17 (or any other position which the electrode must reach) is equal to the one coming from the encoder (or differs from the encoder signed by less than a predetermined tolerance) motor 131 is caused to stop to hold electrode 11 in the required position. Information relative to the required position which the electrode should reach during the various phases of the fusing cycle (i.e., the above-described "program") is input via lead 48a and stored in memory 48b. This stored information is used by CPU 48c as described above to generate appropriate position reference signals during the various phases of the fusing cycle.

Of interest to this invention is that during the fusing operation the displacement of electrode 11 in relation to the workpiece and also the force which electrode 11 applies to the workpiece are preferably continuously monitored and controlled, starting from rest position 17. Position 17 should be at a small distance from the workpiece to avoid having to accomplish long advancement paths which are a waste of machine time. By means of programmable control 48, position 17 can be changed each time an armature with a different commutator diameter needs to be processed. Turret 10 may have to be removed and substituted when the electrode tip is in such a position, which would require removing the armature before dismounting the turret. To avoid having to remove the armature, it is preferable to translate the turret by means of programmable controls so that the electrode tip is positioned at a greater distance from the armature (e.g., at position 18). In this way, the electrode can be caused to assume predetermined positions along axis 42, and also to apply predetermined forces on the workpiece as described in above-mentioned U.S. Pat. No. 5,063,279.

When turret 10 has to be rotated to present a new electrode on axis 42, starting from the electrode in rest position 17, assembly 43 moves translating member 39 in direction 140 by means of closed loop displacement control until gear 30 is aligned with rack 64. This position is typically farther away from the workpiece than rest position 17. When this position is reached, cylinder 60 (FIG. 3) is actuated to engage rack 64 with gear 30 and to release arm 50, as has been described above. Once this has occurred, advancement assembly 43 moves translating member 39 by means of closed loop displacement control 48 for a predetermined distance (typically still farther in direction 140), which causes gear 30 to turn in relation to rack 64 until the new electrode becomes aligned on axis 42. Cylinder 60 (FIG. 3) is then depressurized so that spring 67 (FIGS. 3 and 4) biases lever 58 to cause disengagement between rack 64 and gear 30. This also causes disengagement between abutment surface 69 of lever 58 and idle wheel 57 of cursor 55. In this way, arm 50 will be biased by spring 54 to safely lock shaft 20.

A counter, together with the controls 48 of the fusing machine, determines when all the electrodes of turret 10 have been used. When such a situation is reached, an alarm is activated to warn the operator that the turret must be replaced. Another turret having sharpened and properly configured electrodes can then be mounted on the machine.

Figure 6:
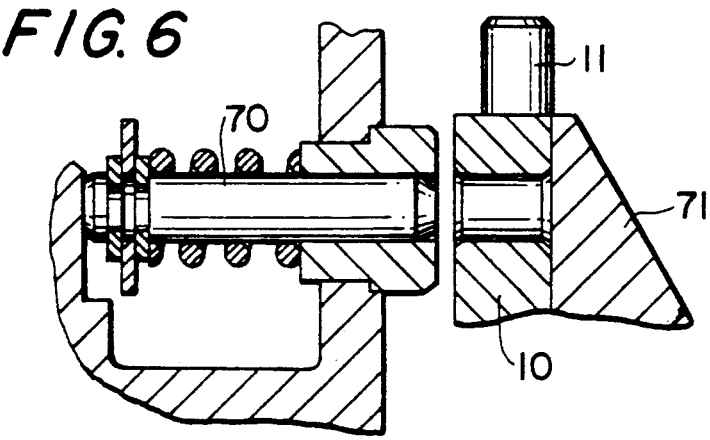
FIG. 6 is a partial elevational sectional view taken along the line 6-6 in FIG. 2.

To remove turret 10 from the machine, spring biased pin 70 (FIGS. 1 and 6) is pushed by the operator in aligned bores 71 of turret 10. At the same time, the operator turns handle 24 in order to release turret 10 from shaft 20. Once screw 23, connected to handle 24, is completely disengaged from bore 25, turret 10 can be removed by simply pulling it along axis 37.

Sharpening of electrodes 11 removes material from their tips and configures them to a required shape. Once such an operation has been carried out, electrodes 11 are fixed to the dismounted turret 10 by using a fixture together with adjustment screw 16 to position them at the same distance from the center of turret 10. Usually such a fixture holds the turret center at a precise distance from a reference plane. Once electrodes 11 have been sharpened, they are mounted on turret 10 by bringing them into abutment with such a reference plane to guarantee that their contact surface is at a predetermined distance from the turret center. Adjustment screw 16 maintains electrode 11 against the reference surface.

After the foregoing operations to fix electrodes 11 to turret 10, it may still occur that the distance between electrodes 11 and the turret center is not the same as the one existing on another turret which has been previously mounted on the machine. For example, the above-described fixture technique may not be sufficiently precise, especially for situations requiring extremely narrow tolerances in the final deformation of the fused parts. Or a less precise method than the above-described fixture method may be used, with the result that relatively large electrode positioning errors occur. Or, as still another possibility, an electrode may shift after it has been used, or play may have developed in the electrode reciprocating direction. Any of these possibilities may make it important for the machine of this invention to include the ability (as will now be described) to precisely determine the location of the tip of a new electrode mounted on the machine.

As has already been mentioned, the electrode's advancement along axis 42 in order to carry out the fusing operation preferably always start from the same rest position 17 of the machine. To place the electrode contact surface in such a position when its distance from the turret center has changed, the newly mounted turret is moved under displacement monitoring and displacement control starting from a known position such as the position of the turret when turrets are substituted until the electrode comes into contact with a reference surface positioned at a known distance from fixed work table surface 111 along axis 42. For example, reference surface 18' (FIG. 1) may be on the opposite side of the turret from the workpiece, and the turret may be raised from the turret replacement position until the upward pointing electrode contacts that surface in order to measure the distance from the center of the turret to the tip of the electrode. In contacting this reference surface, the electrode experiences a sharp change of force which is monitored by the controls of the machine. Such a change of force is experienced for a monitored displacement. By simple calculation carried out by the controls 48 of the machine, the unknown distance between the electrode contact surface and the center of turret 10 can be found. This can be done each time the turret is turned to substitute an electrode, or it can be carried out for all electrodes before a new turret starts fusing. The information relating to the position of the electrode is stored in the machine controls so that the measurement pertaining to a particular electrode can be used when that electrode is employed for fusing. In particular, the position information for each electrode is used to bring the electrode contact surface into the position corresponding to the machine's rest position 17 by actuating assembly 43 using closed loop displacement control.

Figure 12:
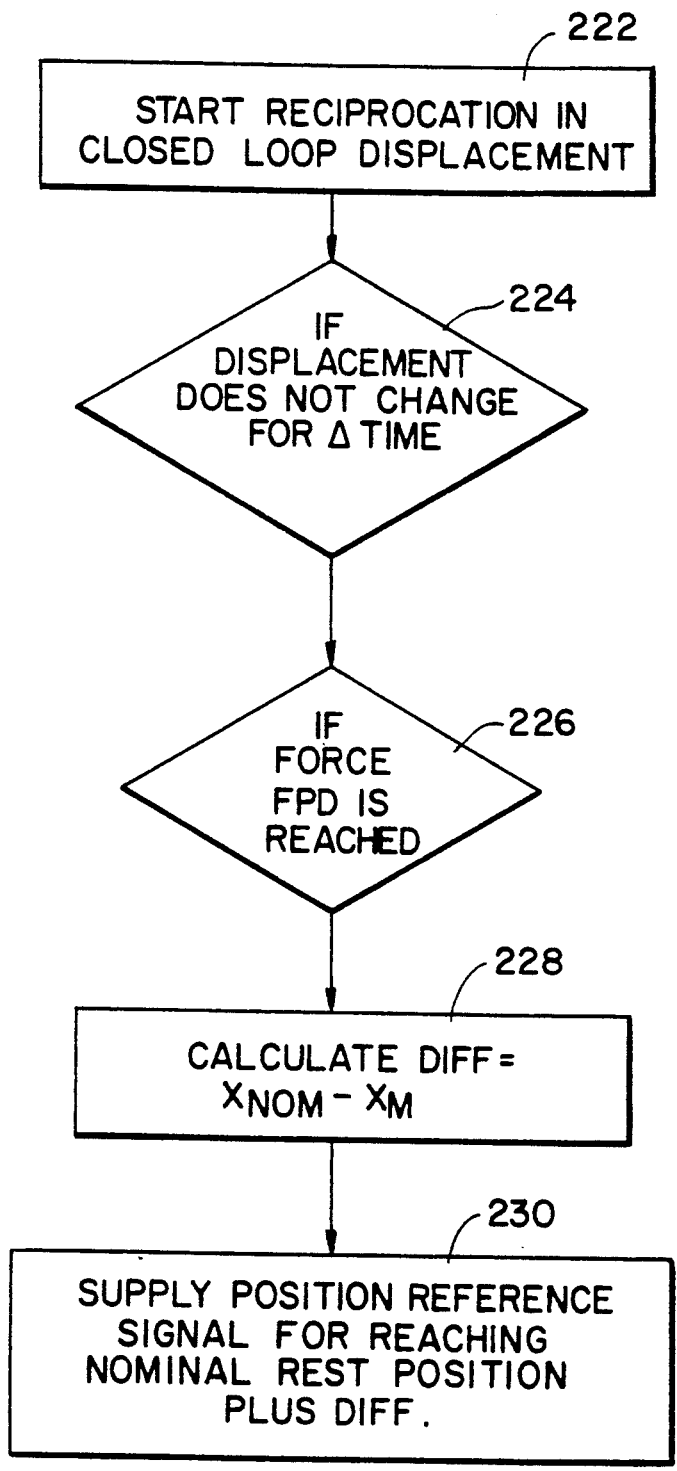
FIG. 12 is a flow chart of an alternative to FIG. 11.

FIGS. 11 and 12 show alternate ways in which closed loop force and/or displacement controls can be used in accordance with this invention to measure the actual location of an electrode tip. The steps shown in each of these FIGS. are performed by machine controls 48 (FIG. 5). In FIG. 11, for example, the first step 202 is to start reciprocation of the turret toward a reference surface such as surface 18' in FIG. 1 under closed loop force control. The resulting displacement is monitored in step 204. Step 206 is performed until a predetermined reaction force FPD is detected (indicating that the electrode has contacted the reference surface). Step 208 (which is optional) can be performed to make sure that a steady-state displacement has been reached. In step 210 a correction value DIFF is computed from the difference between the expected and actual amounts of displacement. Step 212 is performed later when the electrode which has just been tested is to be used for fusing. Step 212 adjusts the location of the turret at the start of each fusing cycle so that the tip of the electrode always starts from predetermined rest position 17.

FIG. 12 is the analog of FIG. 11 using closed loop displacement control. In step 222 closed loop displacement of an electrode toward a reference surface begins. Step 224 is performed until controls 48 detect that displacement has stopped (because the electrode has reached the reference surface). Step 226 (which is optional) is performed to ensure that a steady-state reaction force condition has been reached. Steps 228 and 230 are then respectively identical to steps 210 and 212 in FIG. 11.

Figure 13:
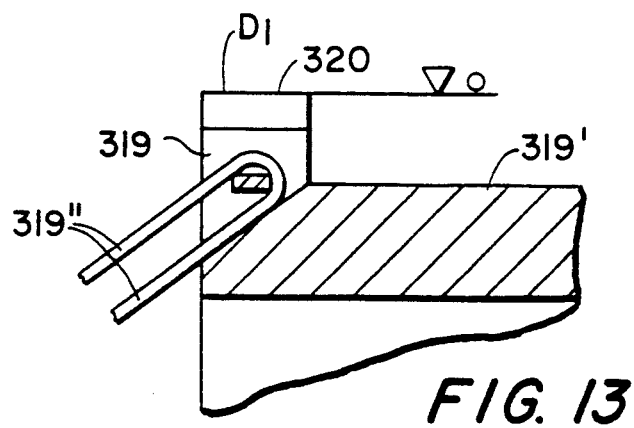
FIG. 13 is a partial elevational sectional view of an alternative type of workpiece which can be processed in the apparatus of this invention.

As an alternative to using a specially provided reference surface such as reference surface 18' in FIG. 1, it may be possible to use a surface of the workpiece (i.e., a surface of the armature commutator) as the reference surface. For example, if the armature has slots 319 for receiving coil leads 319" as shown in FIG. 13, rather than tangs as shown in FIG. 1, the radially outer-most surfaces 320 adjacent the slots may be sufficiently precisely located to act as a reference surface. In that event, the electrode position can be determined by monitoring force and/or motion replies as shown in FIG. 11 or 12 using initial contact against commutator surface 320 in order to reference the fusing cycle parameters accordingly. (For commutators with tangs as shown in FIG. 1, initial contact of an electrode with a tang is generally not a sufficiently reliable indicator of electrode position because commutator tangs are not typically machined with sufficient precision, nor do they typically offer sufficient and consistent resistance to initial deformation.) In addition, with slot-type commutators, it may be desired to reference the final deformation of the fusing operation to the point of initial contact with surface 320 rather than to the remainder of the commutator bar. This may make it unnecessary to determine the eccentricity of the commutator bar as may be required for commutators with tangs and as is discussed elsewhere in this specification.

In cases in which it is sufficient to determine the location of the tip of a new electrode with somewhat less precision, it may be sufficient to bring the electrode tip into contact with a switch placed in a known position rather than into contact with a reference surface. Such a switch can be a contact switch or an optical sensor which supplies a signal (ON or OFF) indicating that the corresponding monitored displacement should be used to calculate the new position of the electrode tip.

An analysis of the force and motion experienced by electrode 11 in contacting the reference surface supplies information for determining whether electrode 11 has been securely mounted on turret 10. Such an analysis is achieved by the controls 48 of the machine and consists of comparing the monitored force (e.g., from step 206 in FIG. 11 or step 226 in FIG. 12) and motion (e.g., from step 208 in FIG. 11 or step 224 in FIG. 12) experienced by electrode 11 during contact with the reference surface with predetermined force and motion values calculated for contact of a properly secured electrode 11 against the same reference surface. For example, if the expected force reply or motion reply does not occur within a predetermined displacement interval of the electrode (i.e., larger than the maximum uncertainty which the position of the electrode tip may have), this probably means that the electrode has been mounted incorrectly. This technique can be used to help ensure safe functioning of the machine.

To obtain passage of an electric current by means of supply cable 38, a ground electrode 80 must be connected to the parts to be fused. To attain this, ground electrode 80 is maintained in engagement with the commutator bar 19' of the tang 19 to be fused. Usually automatic change over of ground electrode 80 is not required because such a member becomes worn at a much slower rate than that of electrodes 11 which come into contact with the parts to be fused.

Figure 7:
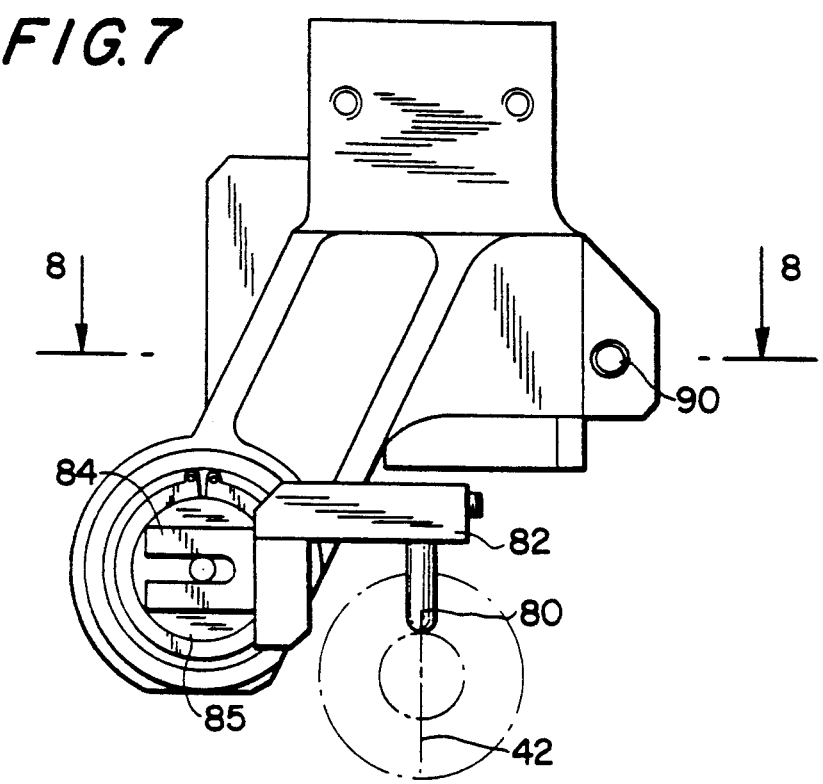
FIG. 7 is a partial elevational view taken in the direction 7 in FIG. 1.
Figure 8:
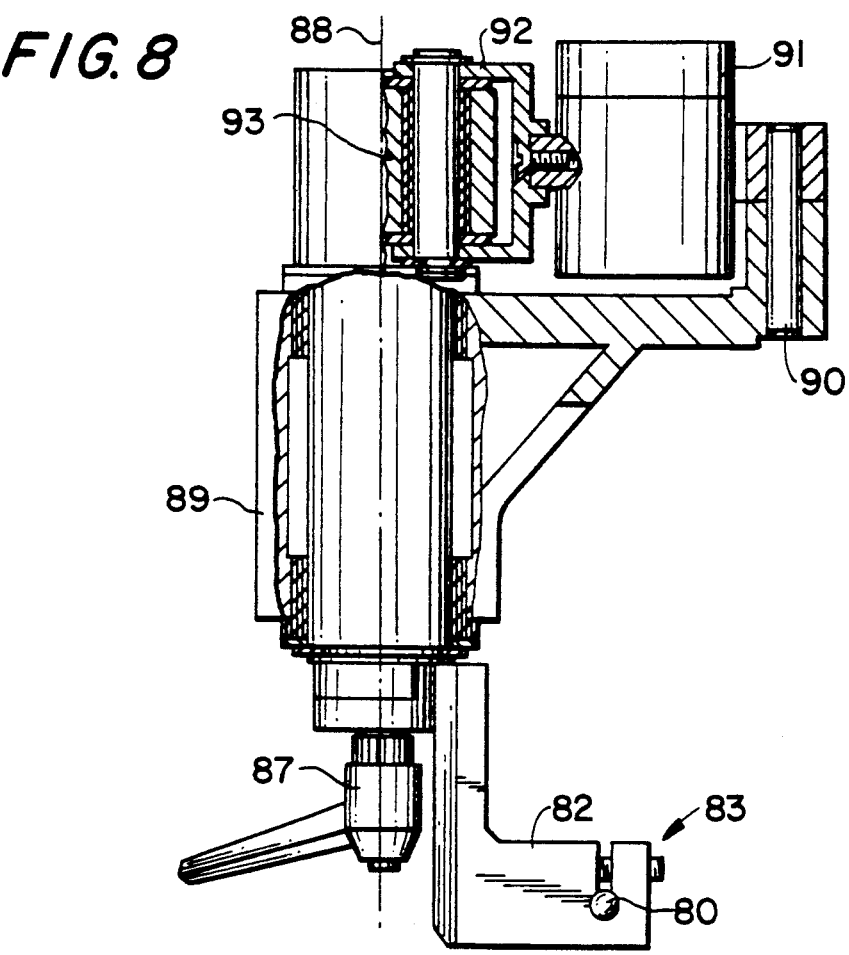
FIG. 8 is a partial plan view, partly in section, taken along the line 8-8 in FIG. 7.

With reference to FIGS. 7 and 8 an L fixture 82 is provided having ground electrode 80 clamped in location 83. Fixture 82 is releasably clamped between a face of shaft 85 and a nut having handle 87 (not shown in FIG. 7 but shown in FIG. 8). Slot portion 84 of fixture 82, embracing a threaded portion of shaft 85, is compressed between handle 87 and the front face of shaft 85. This allows for precise positioning of ground electrode 80 in relation to the armature by simply releasing handle 87 and moving fixture 82 in relation to shaft 85. Ground electrode 80 is usually substituted by releasing handle 87, removing fixture 82 and replacing it with a similar fixture having a new electrode.

Shaft 85 is mounted on bushings of support enclosure 89. In this way, shaft 85 can rotate about axis 88 in order to bring electrode 80 into engagement with the commutator bar when required to fuse, or, when required to disengage the electrode from the commutator bar before rotating the armature to present a new tang for fusing on axis 42.

Support enclosure 89 is connected to the machine frame by means of bolts passing through appropriate bores.

Air cylinder 91 is hinged by pin 90 to support enclosure 89. The air cylinder's rod is connected by means of fork 92 to arm 93 of shaft 85. By extending the air cylinder's rod, ground electrode 80 can be rotated about axis 88 of shaft 85 to engage or disengage the ground electrode from the commutator bar. A ground electrode braid (not shown) is permanently connected to an extension of arm 93 by means of a bolt connection.

Figure 9:
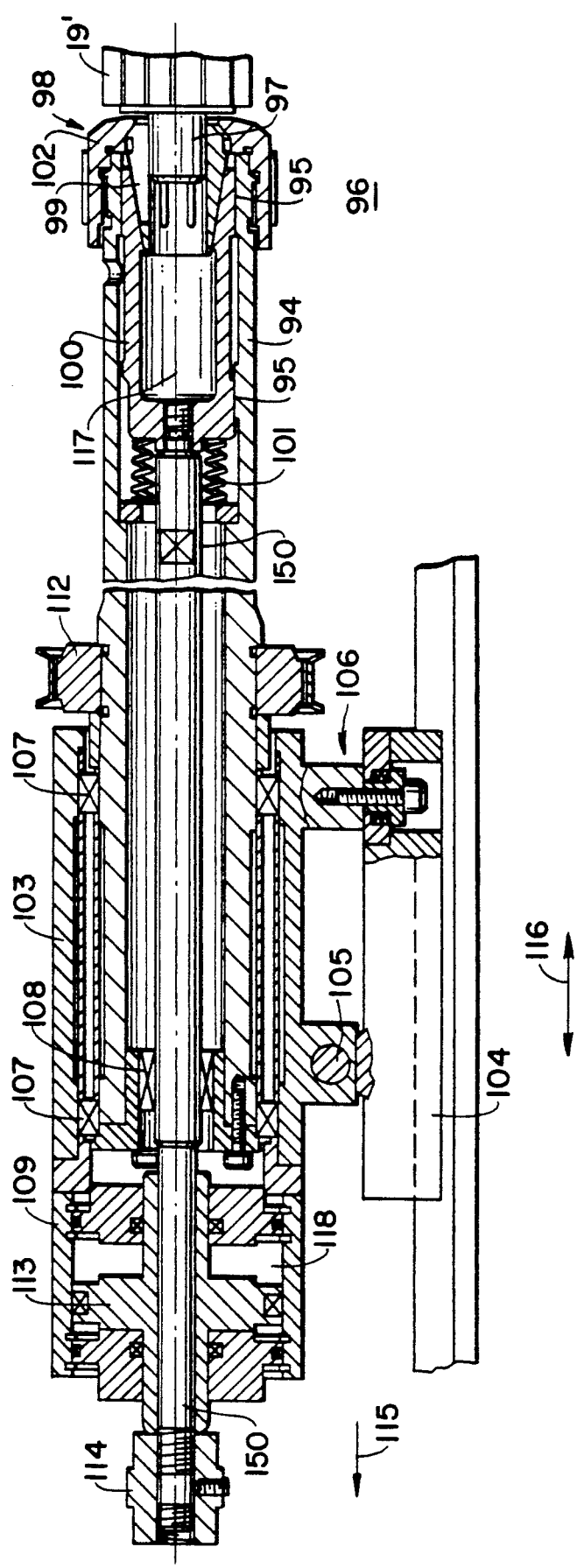
FIG. 9 is a partial elevational sectional view showing a leftward extension of the lower part of FIG. 1.

Once a tang of the armature commutator has been fused, electrode 11 is returned to rest position 17 and the armature is rotated about its longitudinal axis to align a further tang on axis 42. Assembly 96 (FIG. 9) maintains the armature in position during the fusing cycle by keeping the commutator's outer surface in abutment with reaction block 110. Also, assembly 96 rotates the armature to present or align a further tang on axis 42.

Assembly 96 is provided with a gripper portion 98 for gripping armature shaft 97. Such a gripper portion 98 consists of split collet 99 for gripping armature shaft 97. The external surface of collet 99 is engaged by a frustoconical front portion of actuating tube 100. Actuating tube 100 slides on portion 95 of supporting tube 94. A precompressed spring 101 biases actuating tube 100 to force collet 99 to grip shaft 97 of the armature which must be fused.

Removable cap 102 allows for replacement of collet 99 when it is required to grip an armature having a different shaft diameter. When different commutator diameters are processed, reaction blocks 110 (FIG. 1) are also changed in order to maintain the central longitudinal axis 117 of the armature at the same level from the machine work table 111. In other words, reaction block 110, acting as a spacer between fixed surface 111 and the commutator of an armature, is changed to a block 110 having a different thickness when commutators of different diameters are to be fused so that the distance between surface 111 and axis 117 is always substantially the same.

Support tube 94 mounted on bearings 107, is able to rotate about axis 117 in order to turn the armature for presenting a further tang for fusing on axis 42. Toothed pulley wheel 112 fixed to support tube 94 is connected by means of a belt transmission to a motor (not shown). This motor is precisely controlled in order to obtain rotation of the armature to position a further tang for fusing.

Actuating tube 100 is connected to shaft 150 which can translate along axis 117 by being slideably supported in bushing 108. Enclosure 103 carrying bearings 107 has connected to its back end a cylinder 109. This cylinder has a hollow piston 113 for passage of shaft 150. Shaft 150 has fixed to its end a pushing block 114. By pressurizing chamber 118 of cylinder 109, hollow piston 113 abuts and moves pushing block 114 in direction 115. This causes shaft 150 to translate against the biasing action of precompressed spring 101 in order to release armature shaft 97. By discharging chamber 118 the opposite effect can be obtained, i.e , spring 101 biases actuating tube 100 to cause collet 99 to grip armature shaft 97.

Enclosure 103 is mounted on slide 104 so that assembly 96 can be translated in direction 116. Such a translation of slide 104, is accomplished to deliver the armature or to receive it during loading or unloading of the fusing machine. Enclosure 103 is hinged to slide 104 by means of pin 105. Enclosure 103 is biased against slide 104 by means of precompressed spring assembly 106. This spring assembly, which allows angular displacement of support tube 94 about pin 105, is required to guarantee that the commutator is held against reaction block 110 during the fusing operation. Spring assembly 106 also allows for smooth rotation of the commutator on the reaction block 110 during rotation of the armature to present a further tang for fusing. This smooth rotation is obtained because any eccentricity of the commutator's outer surface causes the slide to rotate about pin 105 in order to avoid forcing the commutator against reaction block 110.

It will be understood that the foregoing is merely illustrative of the principles of the invention, and that various modifications can be made by those skilled in the art without departing from the scope and spirit of the invention. For example, certain of the principles discussed herein (e.g., the techniques for measuring the location of the tip of a new electrode, the use of a fusing cycle start position which is always at a predetermined distance from the work-piece and which is closer to the workpiece than an electrode changing position, the use of position sensor 45 or another type of sensor to sense the location of the surface of the workpiece in order to modify the fusing cycle or the fusing cycle stroke, etc.) are equally applicable to other types of fusing machines such as those having only a single fusing head with no rotating turret.

The invention claimed is:

1. Fusing apparatus for fusing electrical conductors together, said fusing apparatus including a plurality of electrodes mounted on a turret which is rotatable about a rotation axis, said electrodes being circumferentially spaced from one another about said rotation axis, said turret also being reciprocable along a reciprocation axis which is transverse to said rotation axis in order to momentarily bring an electrode which is substantially aligned with said reciprocation axis into contact with said conductors in order to apply heat and pressure to said conductors and thereby fuse them together, said apparatus comprising:

means for reciprocating said turret along said reciprocation axis; and means selectively responsive to movement of said turret along said reciprocation axis for causing said turret to rotate about said rotation axis as a result of and in conjunction with reciprocation along said reciprocation axis in order to change the electrode aligned with said reciprocation axis.

2. The apparatus defined in claim 1 wherein said means for reciprocating moves said turret in a first direction along said reciprocation axis in order to being an electrode substantially aligned with said reciprocation axis into contact with said conductors, and wherein said means responsive to movement of said turret along said reciprocation axis is responsive to movement of said turret in a second direction along said reciprocation axis which is opposite to said first direction.

3. The apparatus defined in claim 1 further comprising a frame relative to which said turret rotates and reciprocates, and wherein said means responsive to movement of said turret along said reciprocation axis includes means mounted on said frame for selectively engaging a portion of said turret in order to rotate said turret as said turret moves along said reciprocation axis.

4. The apparatus defined in claim 3 further comprising:
means for normally preventing said turret from rotating about said rotation axis; and
means responsive to engagement of said portion of said turret by said means mounted on said frame for disabling said means for normally preventing while said means mounted on said frame is in engagement with said portion of said turret.

5. The apparatus defined in claim 3 wherein said means for reciprocating comprises an actuator mounted on said frame.

6. The apparatus defined in claim 5 wherein said turret includes a gear concentric with said rotation axis, and wherein said means mounted on said frame comprises:
a rack having a longitudinal axis substantially parallel to said reciprocation axis; and
means for moving said rack substantially perpendicular to said reciprocation axis so that said rack engages said gear and causes said gear and said turret to rotate as said turret moves along said reciprocation axis.

7. The apparatus defined in claim 6 further comprising:
means for normally preventing said turret from rotating about said rotation axis; and
means responsive to movement of said rack into engagement with said gear for disabling said means for normally preventing while said rack is in engagement with said gear.

8. Apparatus for fusing electrical conductors to electric motor parts comprising:
a fusing electrode holder;
means for removably mounting a fusing electrode on said fusing electrode holder; and
means for moving said fusing electrode holder along a reciprocation axis; wherein:
during fusing operations, said means for moving reciprocates said fusing electrode holder between an intermediate position in which said fusing electrode is spaced from an electric motor part being fused sufficiently to allow said electric motor part being fused to be moved relative to said fusing electrode to position successive fusing sites on said electric motor part being fused in alignment with said fusing electrode, and a fusing position in which said fusing electrode is in fusing contact with said electric motor part being fused; and
for replacement of said electrode holder, said means for moving moves said fusing electrode holder to an electrode replacement position which is more remote from said electric motor part being fused than said intermediate position.

9. The apparatus defined in claim 8 wherein said electrode replacement position is sufficiently far from said electric motor part being fused that said fusing electrode can be removed from said fusing electrode holder and replaced with a new fusing electrode without having to remove said electric motor part being fused.

10. The apparatus defined in claim 8 wherein said means for removably mounting comprises a turret for holding a plurality of fusing electrodes circumferentially spaced from one another about a rotational axis, said turret being rotatable about said rotation axis relative to said fusing electrode holder to successively position each of said fusing electrodes for fusing electric motor parts.

11. The apparatus defined in claim 10 further comprising:
means for rotating said turret while said turret is at least as far from said electric motor part being fused as said intermediate position.

12. The apparatus defined in claim 11 wherein said means for rotating is responsive to movement of said electrode holder between said intermediate position and said electrode replacement position.

13. The apparatus defined in claim 11 further comprises:
means for preventing said turret from rotating except during operation of said means for rotating.

14. The apparatus defined in claim 10 wherein said turret is removable from said fusing electrode holder when said fusing electrode holder is in said electrode replacement position.

15. The apparatus defined in claim 8 further comprising:
means for sensing the location substantially parallel to said reciprocation axis of a surface of said electric motor part being fused.

16. The apparatus defined in claim 15 wherein said means for moving said fusing electrode holder is responsive to said means for sensing in order to establish said intermediate position at a predetermined distance from said surface of said electric motor part being fused.

17. Apparatus for fusing electrical conductors to electric motor parts, said electrical conductors and said electric motor parts to be fused collectively comprising a workpiece, said apparatus comprising:
a fusing electrode having a tip;
means for reciprocating said fusing electrode along a predetermined path so that said tip can be pressed against said workpiece when said fusing electrode is moved in one direction along said path and retracted from said workpiece when said workpiece is moved in the opposite direction along said path; and
means for determining the location of said tip relative to a zeroing position on said apparatus.

18. The apparatus defined in claim 17 wherein said means for reciprocating is responsive to said means for determining so that said means for reciprocating can move said tip to at least one predetermined position along said path regardless of the location of said tip relative to the zeroing position on the apparatus.

19. The apparatus defined in claim 18 further comprising:
means for monitoring the operation of said means for reciprocating to produce an output indication having a value which is proportional to the position of said fusing electrode along said path;
a reference surface at a predetermined location along said path;
means for detecting when said tip contacts said reference surface; and
wherein said means for determining detects the value of said output indication when said means for detecting detects that said tip has contacted said reference surface.

20. The apparatus defined in claim 18 wherein said at least one predetermined position is the point on said path at which said fusing electrode begins to move toward said workpiece to perform a fusing operation.

21. The apparatus defined in claim 18 wherein said at least one predetermined position is the point on said path at which said fusing electrode stops moving toward said workpiece during the performance of a fusing operation.

* * * * *